United States Patent
Mahadevan et al.

(10) Patent No.: US 8,204,211 B2
(45) Date of Patent: Jun. 19, 2012

(54) SYSTEMS AND METHODS FOR SELECTING TONES FOR FAR-END CROSS TALK MITIGATION

(75) Inventors: Amitkumar Mahadevan, Eatontown, NJ (US); Patrick Duvaut, Paris (FR); Laurent Francis Alloin, Monmouth Beach, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 408 days.

(21) Appl. No.: 12/431,878

(22) Filed: Apr. 29, 2009

(65) Prior Publication Data

US 2010/0278328 A1    Nov. 4, 2010

(51) Int. Cl.
*H04M 1/00* (2006.01)
*H04M 9/00* (2006.01)
*H04M 1/76* (2006.01)

(52) U.S. Cl. ........................................ 379/417
(58) Field of Classification Search .................... 379/417
See application file for complete search history.

(56) References Cited

U.S. PATENT DOCUMENTS

| | | |
|---|---|---|
| 6,292,559 B1 | 9/2001 | Gaikwad et al. |
| 6,990,196 B2 | 1/2006 | Zeng et al. |
| 6,999,583 B2 | 2/2006 | Valenti et al. |
| 7,023,908 B2 | 4/2006 | Nordstrom et al. |
| 7,315,592 B2 | 1/2008 | Tsatsanis et al. |
| 7,577,209 B2 | 8/2009 | Poon |
| 7,835,368 B2 | 11/2010 | Duvaut et al. |
| 2001/0004383 A1 | 6/2001 | Nordstrom et al. |
| 2001/0055332 A1 | 12/2001 | Sadjadpour et al. |
| 2003/0072380 A1 | 4/2003 | Huang |
| 2003/0137925 A1 | 7/2003 | Zamir |
| 2004/0086064 A1* | 5/2004 | Van Acker et al. .......... 375/346 |
| 2006/0002462 A1 | 1/2006 | Park |
| 2006/0056522 A1 | 3/2006 | Tsatsanis et al. |
| 2006/0227815 A1 | 10/2006 | Khan |
| 2007/0004286 A1 | 1/2007 | Hobbel |

(Continued)

FOREIGN PATENT DOCUMENTS

WO  PCT/US2008/080470   10/2008

OTHER PUBLICATIONS

ISR and WO for related PCT Application No. PCT/US2008/087906 mailed Feb. 13, 2009.

(Continued)

*Primary Examiner* — Alexander Jamal
(74) *Attorney, Agent, or Firm* — Mark J. Danielson; Pillsbury Winthrop Shaw Pittman LLP

(57) ABSTRACT

Systems and methods are described for selecting tones for far-end crosstalk (FEXT) mitigation. In particular, systems and methods are described for performing far-end crosstalk (FEXT) mitigation within a digital subscriber line (xDSL) system. One embodiment is a method that comprises determining a first set of function values relating to a per-tone signal-to-noise ratio (SNR) for a user among a plurality of users for a number of tones, wherein the number of tones is less than or equal to a total number of tones available for transmission. The method further comprises estimating coefficients for performing FEXT mitigation for the number of tones, performing FEXT mitigation on the number of tones based on the estimated coefficients, and performing FEXT mitigation on a selected group of tones from among the number of tones, wherein the selected group of tones is less than or equal to the number tones.

27 Claims, 6 Drawing Sheets

U.S. PATENT DOCUMENTS

2007/0110135 A1    5/2007    Guess et al.

OTHER PUBLICATIONS

ISR and WO for related PCT Application No. PCT/US2008/080470 mailed Dec. 16, 2008.
Benveniste, et al. "Adaptive Algorithms for Stochastic Approximations," Springer Verlag, New-York, 1990.
Biyani, et al., "Cooperative MIMO Alien Noise Cancellation in Upstream VDSL", accepted for presentation at ICASSP 2009, Taipei, Taiwan, Apr. 2009.
Bliss, et al., "Environmental Issues for MIMO Capacity" IEEE Transaction on Signal Processing, vol. 50, No. 9, pp. 2128-2142, Sep. 2002.
Cendrillon et al., "Improved Linear Crosstalk Precompensation for DSL," in Processing IEEE ICASSP, May 2004, pp. 1053-1056.
Duvaut, et al., Gvdsl: Answers to questions and concerns related to reporting the error(f) for Self FEXT cancellation, ITU Telecommunication Standardization Sector, Study Group 15, Napa Valley, CA, Apr. 16-20, 2007.
Duvaut, et al., "G.vdsl: Proposed Requirements on Back Channel for Estimating MIMO Channel in VDSL2", Conexant Systems Inc., CD-041, Denver, Colorado, Sep. 25-29, 2006.
Duvaut, et al., "Updated Proposal for Construction of a MIMO Channel Model for Evaluation of FEXT Cancellation Systems," Conexant Systems Inc., NIPPNAI-2007-009R1, San Francisco, California, Dec. 5-7, 2006.
Duvaut, et al.,"G.vdsl: Using Error Samples for Downstream Self FEXT Cancellation Pre-coding in VDSL2," Conexant Systems Inc., SD-052, San Diego, California, Jan. 15-19, 2007.
ITU-T, G.993.2, "Very High Speed Digital Subscriber Line Transceiver 2 (VDSL2)", Series G: Transmission Systems and Media, Digital Systems and Networks—Digital Sections and Digital Line System—Access Networks, Feb. 2006.
ITU-T, G. 993.5,"Self-FEXT Cancellation (Vectoring) for use with VDSL2 Transceivers", Series G: Transmission System and Media Digital Systems and Networks, Digital sections and digital line system—Access networks, Apr. 2010.
Ginis, et al, "Alien Crosstalk Cancelation for Multipair DSL", EURASIP Journal on Applied Signal Processing, vol. 2006, May 2005; p. 1-12.
Ilani, Ishai, "Channel Estimation by "Abuse" of Receivers," Actelis Networks, NIPPNAI-098, Savannah, Georgia, Jun. 26-29, 2006.
Jagannathan, et al, "Spatial Noise Cancellation Using Extra Wire-Pairs in the DSL Downstream", NIPPNAI-2006-129R1, Vancouver, BC, Canada, Oct. 9-12, 2006.
Karipidis, et al., "Crosstalk Models for Short VDSL2 Lines from 30MHz Measured Data", Eurasip Journal on Applied Signal processing, vol. 2006, Aug. 2005; Article 85859, pp. 1-9.
Leshem, et al., "A Low Complexity Coordinated FEXT Cancellation for VDSL" ICECS, Dec. 2004, pp. 338-341.
Louveaux, et al., "Adaptive DSL Crosstalk Precancellation Design Using Low-Rate Feedback From End Users," IEEE Signal Processing Letters, vol. 13, No. 11, pp. 665-668, Nov. 2006.
Louveaux et al., "Error Sign Feedback as an Alternative to Pilots for Tracking of FEXT Transfer Functions in Downstream VDSL," EURASIP Journal Applied Signal Processing, Article ID 94105vol. 2006, pp. 1-14.
Sjoberg, et al., "G.vdsl: Using Orthogonal Pilot Sequences for Assisting FEXT Channel Estimation in Vector Transmission", Upzide Labs, ITU SD-036, San Diego, California Jan. 15-19, 2007.
Tsatsanis, M."Vectoring Techniques for Multi-Line 10MDSL Systems," T1E1.4 committee, contribution 2002-196, Aug. 2002.
Wiese, et al., "Programmable Implementation of xDSL Transceivers", IEEE Communication Magazine, vol. 38, Issue 5, May 2000.
G. Ginis and J. M. Cioffi, "Vectored transmission for digital subscriber line systems," IEEE Journal on Selected Areas in Communications, vol. 20, No. 5, pp. 1085-1104, 2002.
R. Cendrillon, M. Moonen, G. Ginis, K. Van Acker, T.Bostoen, and P. Vandaele, "Partial crosstalk cancellation for upstream VDSL," EURASIP Journal on Applied Signal Processing, vol. 2004, No. 10, pp. 1520-1535, 2004.
Amir R. Forouzan and Lee M. Garth, "Computationally Efficient Partial Crosstalk Cancellation in Fast Time-Varying DSL Crosstalk Environments", EURASIP Journal on Advances in Signal Processing, vol. 2007, Article ID 72041.
P. Tsiaflakis, J. Vangorp, M. Moonen, J. Verlinden, and G. Ysebaert, "Partial crosstalk cancellation in a multi-user xDSL environment," Proceedings of IEEE International Conference on Communications (ICC '06), vol. 7, pp. 3264-3269, Istanbul, Turkey, Jun. 2006.
P. Duvaut et al., "Adaptive Off-Diagonal MIMO Precoder (ODMP) for Downstream DSL Self FEXT Cancellation", Proceedings of the IEEE Global Telecommunications Conference, GLOBECOM 2007, Washington DC, Nov. 26-30, 2007.
P. Duvaut et al., "Adaptive Off-Diagonal MIMO Canceller (ODMC) for VDSL Upstream Self FEXT Mitigation", submitted to EUSIPCO 2008.
U.S. Appl. No. 12/100,253, Cooperative MIMO Alien Noise Cancellation (CoMAC) for Upstream VDSL Systems; filed Apr. 9, 2008, Biyani et al.

* cited by examiner

SYSTEMS AND METHODS FOR SELECTING TONES FOR FAR-END CROSS TALK MITIGATION

TECHNICAL FIELD

The present disclosure generally relates to communications systems and more particularly, relates to systems and methods for mitigating the effects of downstream and upstream far-end cross talk (FEXT) in a digital subscriber line (xDSL) system.

BACKGROUND

Digital subscriber line (xDSL) technology is a technology that has developed in recent years in response to the demand for high-speed Internet access. xDSL technology utilizes the communication medium of pre-existing telephone systems. Thus, both plain old telephone systems (POTS) and xDSL systems share a common line for xDSL-compatible customer premises. Similarly, other services such as time compression multiplexing (TCM) integrated services digital network (ISDN) can also share a common line with xDSL and POTS.

In the field of telecommunications, the term "crosstalk" refers to interference that enters a message channel or disturbed channel from one or more other interfering channels (or disturbing channels) through a path coupling the interfering channels to the message channel. Crosstalk leads to reduced signal-to-noise ratio (SNR) that can create low audio quality in a voice system or reduced data rates and/or increased errors in a data system. The degree in which crosstalk impacts the communication line will depend in part on such factors as the listener's hearing acuity, extraneous noise on the communication line, the frequency response of the coupling path, and the level of the disturbing signal.

There are generally two types of crosstalk mechanisms that are characterized, one being far end crosstalk (FEXT) and the other one being near-end crosstalk (NEXT). FEXT refers to electromagnetic coupling that occurs when the receiver on a disturbed pair is located at the far end of the communication line as the transmitter of a disturbing pair. Self-FEXT generally refers to interference caused by neighboring lines provisioned for the same type of service as the affected line. In contrast, NEXT results from a disturbing source connected at one end of the wire pair which causes interference in the message channel at the same end as the disturbing source.

Allocations of wire pairs within telephone cables in accordance with service requests have typically resulted in a random distribution of pair utilization with few precise records of actual configurations. Because of the physical proximity of different twisted pairs within a cable bundle (due to pair twisting, cable branching, cable splicing, etc.), crosstalk caused by the electromagnetic interference between the neighboring lines is often the dominating noise source in the transmission environment. In addition, due to pair twisting in cables where cable branching and splicing take place, a wire pair can be in close proximity to many different pairs spanning different portions of its length. At a telephone CO (central office), pairs in close proximity may carry diverse types of service using various modulation schemes, with considerable differences in signal levels (and receiver sensitivities) especially for pairs of considerably different lengths.

Both FEXT and self-FEXT continue to be a problem in xDSL communication systems as crosstalk impacts overall performance. Current approaches to addressing crosstalk suffer from various perceived shortcomings, such as increased design costs and inefficient use of computing resources. Therefore, a heretofore unaddressed need exists in the industry to address the aforementioned deficiencies and inadequacies.

SUMMARY

Briefly described, one embodiment, among others, is a method for performing far-end crosstalk (FEXT) mitigation within a digital subscriber line (xDSL) system. The method comprises determining a first set of function values relating to a per-tone signal-to-noise ratio (SNR) for a user among a plurality of users for a number of tones, wherein the number of tones is less than or equal to a total number of tones available for transmission. The method further comprises estimating coefficients for performing FEXT mitigation for the number of tones, performing FEXT mitigation on the number of tones based on the estimated coefficients, and performing FEXT mitigation on a selected group of tones from among the number of tones, wherein the selected group of tones is less than or equal to the number tones.

Another embodiment is a system for performing far-end crosstalk (FEXT) mitigation. The system comprises a tone selection module configured to select a group of tones from among a number of tones for each of a plurality of users, wherein the number of tones is less than or equal to a total number of tones available for transmission. The system further comprises a FEXT mitigator configured to perform FEXT mitigation on a selected group of tones for each of the plurality of users.

Another embodiment is a method that comprises performing signal vectoring at the CO across a plurality of users to mitigate self-FEXT and determining a first set of function values for each of the plurality of users for each tone among a total number of tones available for transmission in the xDSL system, wherein determining the first set of function values is performed with FEXT mitigation not activated. For up to the total number of tones, coefficients are estimated for performing FEXT mitigation for each tone. The method further comprises performing FEXT mitigation for the plurality of users on up to the total number of tones based on the estimated coefficients and determining a second set function values for each the plurality of users for up to the total number of tones while performing FEXT mitigation. Based on the first set and second set of function values, a set of tones on which to perform FEXT mitigation is selected for each user. The method further comprises performing FEXT mitigation on the selected set of tones for each user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
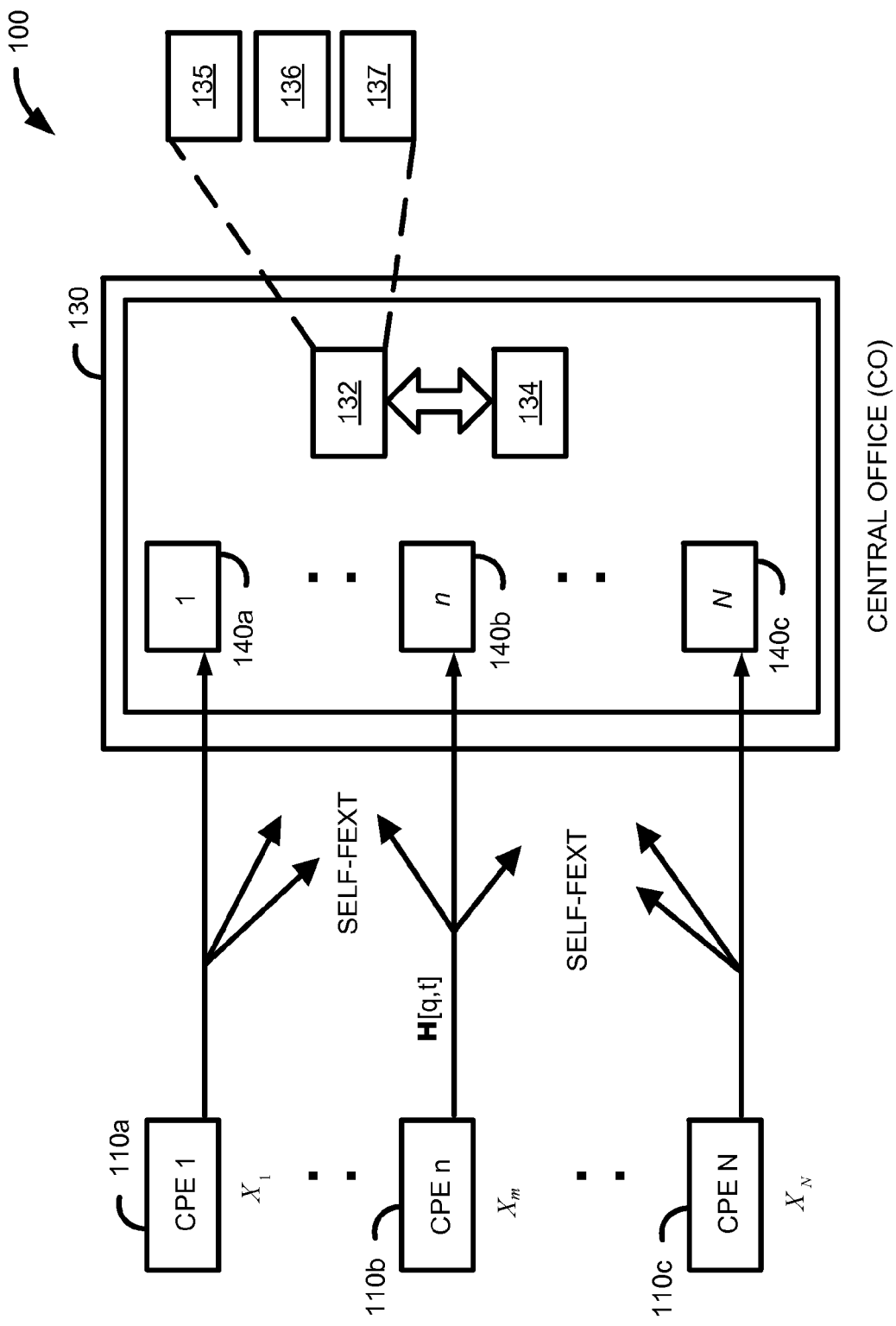
FIGS. 1A-B illustrate different configurations of a system in which embodiments for performing tone selection may be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In order to adjust for performance variations over the entire available spectrum, digital subscriber line (xDSL) systems typically use discrete multi-tone (DMT) techniques (e.g., a multi-carrier technique) that divide the available bandwidth of twisted-pair copper lines into multiple channels or "bins." Using DMT, the available bandwidth is broken into a plurality of sub-channels or tones and data is simultaneously transferred over several of the sub-channels depending upon the transmission characteristics of each sub-channel. For example, in conventional xDSL systems such as ADSL, the copper transmission line is divided into 256 DMT tones or sub-channels, with consecutive sub-channels having a center frequency separated by 4.3125 kHz.

With DMT, a plurality of frames of a data stream is broken down into data blocks. Each data block is allocated to multiple sub-channels. The signal on a sub-channel, in turn, can be represented as a complex value modulating a carrier whose frequency is the same as the center frequency of the sub-channel. The magnitude and phase of the complex value is based on the data that the sub-channel is carrying and on the amount of bits that the sub-channel can support, sometimes referred to as bit-loading. The bit-loading on a given sub-channel is indicative of the number of constellation points (e.g., the number of magnitude and phase combinations of the complex value) that can be transmitted. Thus, if the bit-loading of a particular carrier channel is 2, then the number of constellation points is 4, with a constellation point in each quadrant representing the binary number 00, 01, 10, or 11, for example. This process of associating binary numbers to constellation points is sometimes referred to as "constellation encoding" or "constellation mapping."

Each sub-channel typically carries between 1 to 15 bits of data that are mapped on the constellation points of an appropriately sized quadrature amplitude modulation (QAM) constellation. The signals of the plurality of sub-channels are then summed to produce a time domain DMT symbol that is subsequently transmitted over the twisted-pair copper line. That is, each of the carriers that make up the DMT symbol contains a QAM signal. A DMT symbol is generated for each frame of the original data stream. This results essentially in overall performance which is equivalent to around two hundred V.34 modems used in parallel on the same line. Because each carrier channel can be configured to a different bit rate according to the channel characteristics, it can be seen that DMT is inherently "rate-adaptive" and extremely flexible for interfacing with different subscriber equipment and line conditions.

VDSL (very high bitrate DSL) is becoming more commonly utilized as the last mile solution for high speed data communications. The data rate for VDSL, however, may be impaired by many different sources of disturbance, including self-induced crosstalk, impulse noise, alien noise, among other sources. Dynamic spectrum management level 3 (DSM3) is one approach to mitigating the effects of self-FEXT. To mitigate the effects of self-FEXT, DSM3 compliant devices generally utilize a technique known as signal cooperation or signal vectoring at the central-office (CO) that employs processing on a per-frequency or per-tone basis in order to mitigate self-FEXT in both the upstream and downstream directions. In the upstream direction, signal vectoring may take advantage of simultaneous access to the received signals of all vectored users at the CO to also effectively mitigate alien crosstalk.

The capability of performing signal cooperation at the CO makes this technique suitable for implementing per-frequency FEXT mitigation processing in both directions at the CO. This approach, however, generally requires significant computational resources at the CO. Practical FEXT mitigation schemes in vectored VDSL systems therefore generally operate under the limitation of some degree of computational and/or storage constraints at the CO. In particular, a limit is placed on the number of frequency tones or sub-channels on which FEXT mitigation is performed. Under such scenarios, it is advantageous to systematically and optimally select tones for FEXT mitigation in order to achieve maximum performance with the limited computational resources available at the CO.

In certain situations, it may be possible to perform signal cooperation and FEXT mitigation at the CPE side in addition to the CO side. An example is a multi-pair bonded xDSL system where the CPE is connected to the CO through two or more twisted pairs. When signal cooperation is possible at both the CO and CPE sides, FEXT mitigation for a given direction may be performed at either end. For example, both downstream and upstream FEXT mitigation may be performed at the CO side, or both downstream and upstream FEXT mitigation may be performed at the CPE side. Further, downstream FEXT mitigation may be performed at the CPE side while upstream FEXT mitigation may be performed at the CO side. In yet other embodiments, downstream FEXT mitigation may be performed at the CO side while upstream FEXT mitigation may be performed at the CPE side. When signal cooperation and FEXT mitigation for any direction is carried out at the CPE side, the limitations on the computational resources for performing FEXT mitigation are likely to be even more severe. It is thus advantageous to systematically and optimally select tones for FEXT mitigation in order to achieve maximum performance with the limited computational resources available.

Various embodiments are described for determining tones on which per-frequency or per-sub-channel FEXT mitigation is employed in order to maximize the improvement of a chosen performance measure such as data rate based on a maximum number on tones on which FEXT can be mitigated and based on limited computational resources. For a particular direction of operation (upstream/downstream), various embodiments are described for determining the SNR (signal-to-noise ratio) and a suitably defined function of the per-tone SNR, determining improvements in this function of the per-tone SNR possible via per-frequency FEXT mitigation over any subset of the entire set of supported frequencies for transmission, and then selecting those frequencies or tones associated with the largest improvement in the function of the per-tone SNR.

Reference is made to FIG. 1A, which illustrates a system 100 in which embodiments for performing tone selection may be implemented. In accordance with some embodiments, the system may comprise a DMT-based xDSL system. As depicted in FIG. 1A, the system includes N sets of CPE (customer premises equipment) or users 110a, 110b, 110c, where each user 110a, 110b, 110c is referenced by index n. The system 100 further comprises a tone selection module 132, which performs tone selection for FEXT mitigation, as described in more detail below.

In general, and irrespective of whether signal cooperation and FEXT mitigation is performed at the CO or CPE, the tone-selection module 132 for a given direction of operation (e.g., upstream vs. downstream) can be implemented either at the CO or the CPE. For embodiments where the tone selection module 132 for both directions is implemented within the CO (CO-centric tone-selection), a protocol established between the CO and each CPE may be used to provide transport of information from the various CPEs (or end users) back to the CO in order to perform tone selection at the CO for downstream FEXT mitigation. For upstream FEXT mitigation in a CO-centric tone-selection implementation, the information used for tone-selection already resides at the CO. For other embodiments, the tone selection module 132 for both directions may be implemented within the CPE 110a, 110b, 110c (CPE-centric tone-selection). For such embodiments, a protocol is incorporated to provide transport of information from the CO to the CPE in order to allow the CPE to satisfactorily perform tone selection for upstream FEXT mitigation. For downstream FEXT mitigation in a CPE-centric tone-selection case, the information used for tone-selection already resides on the CPE.

For yet other embodiments, the tone selection module 132 for the downstream direction may be implemented within the CPE 110a, 110b, 110c, while the tone selection module for the upstream direction may be implemented within the CO (for distributed tone-selection). For such embodiments, the information required for tone-selection in a particular direction resides at the same end where the corresponding tone-selection module is situated. As such, a protocol for transporting information for tone-selection is not required.

The system 100 further comprises a FEXT mitigator 134 which performs computations on a per-tone basis based on the tones provided by the tone selection module 132 to address the effects of FEXT. In accordance with some embodiments, the FEXT mitigator 134 may comprise a MIMO (multiple-input multiple-output) precoder for FEXT associated with the downstream direction. For the upstream direction, the FEXT mitigator 134 may comprise a MIMO canceller. In accordance with such embodiments, the FEXT mitigator 134 may further comprise a canceller to address noise from external sources. The CO 130 may also include an xDSL access multiplexer (DSLAM), xDSL line cards 140a, 140b, 140c, and other equipment for interfacing with users 110a, 110b, 110c. In some embodiments, the xDSL line cards 140a, 140b, 140c may interface with the tone selection module 132. Furthermore, for any given direction of operation, if the FEXT mitigator 134 and tone selection module 132 for that direction are located at different ends (i.e., one of the modules is at the CO while the other is at the CPE), another protocol may have to be incorporated between the CO and CPE to transport information of the tones selected by the tone selection module 132 to the FEXT mitigator 134.

Figure 1B:
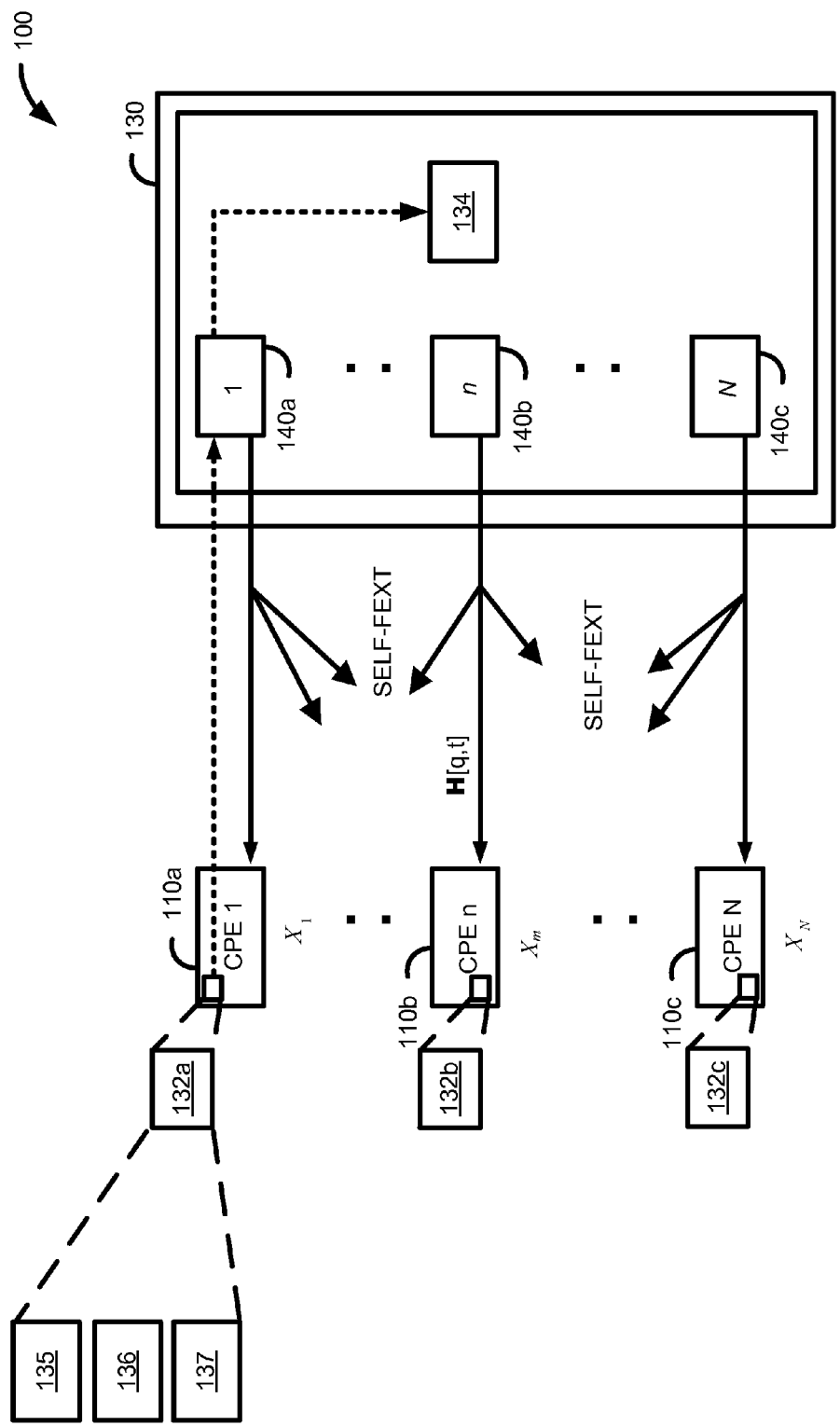

For purposes of this disclosure, the number of users 110a, 110b, 110c participating in vectored upstream and downstream self-FEXT cancellation is denoted by N. For each sub-channel associated with the set of N users 110a, 110b, 110c, the frequency response for the sub-channel is represented by the [N, N] matrix H[q,t] at DMT-symbol time instant t and discrete frequency q. For the non-limiting DMT based xDSL system depicted in FIG. 1A, there are N separate users (or N sets of CPE 110a, 110b, 110c) where each user 110a, 110b, 110c is referenced using an index n. The quantity x[q,t] is used to represent upstream data and in particular, an N×1 vectored upstream signal transmitted from a plurality of N CPEs in data mode. FIG. 1A depicts an embodiment where the upstream tone-selection module as well as the upstream FEXT mitigator are both located at the CO. It should be noted, however, that other configurations are also possible. For example, FIG. 1B depicts an embodiment for the downstream direction where a FEXT mitigator 134 is located at the CO but where each CPE 110a, 110b, 110c comprises a tone selector 132a, 132b, 132c. For such configurations, the CPEs 110a, 110b, 110c may convey tone selection information to the CO 130 via a low speed back channel, for instance.

Figure 2:
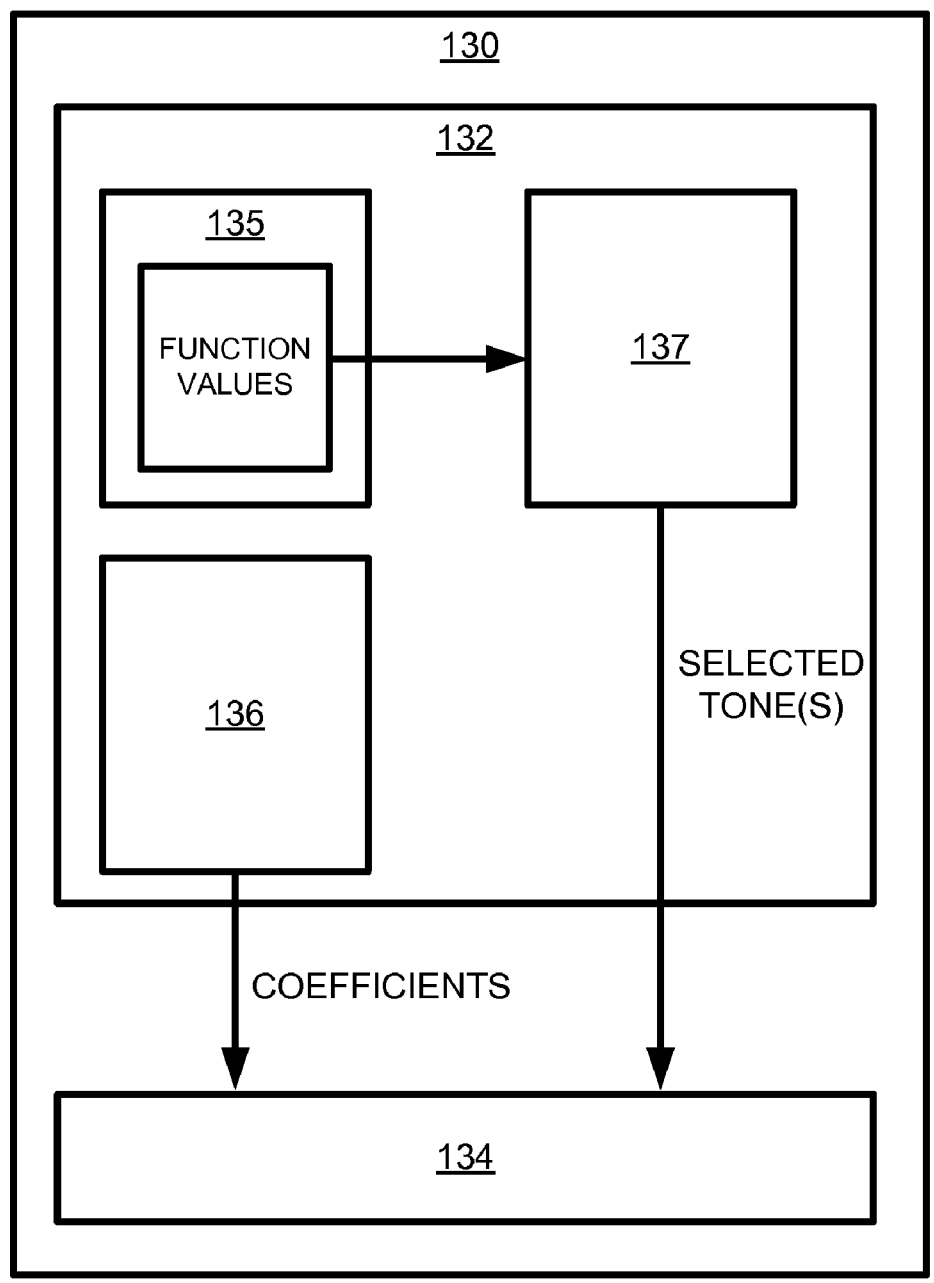
FIG. 2 depicts various components of the tone selection module depicted in FIG. 1.

Reference is made to FIG. 2, which depicts various components of the tone selection module 132 depicted in FIG. 1. The tone selection module 132 may further comprise logic 135 for calculating a value of a function relating to the measured per-tone signal-to-noise ratio (SNR) associated with each of the N users 110a, 110b, 110c depicted in FIG. 1. For some embodiments, the value of the function may comprise bit-loading data. The bit-loading data is computed from the SNR based on Shannon's capacity computation assuming a design bit-error rate, a margin and coding gain. One should note that other functions relating to the SNR may also be utilized. For example, other functions that may be utilized relate to the aggregate SNR of all or a subset of the tones. Another function that may be used is the noise margin. Alternatively, the SNR values themselves may also be utilized. In this regard, either the SNR or a metric/function relating to the SNR is used in the tone selection process.

The values of the function relating to the measured per-tone SNR for each of N users 110a, 110b, 110c are stored before and after FEXT mitigation is performed. For embodiments utilizing bit-loading data as the function, for example, bit-loading tables are calculated during initialization according to measured signal-to-noise ratios (SNRs) to allow optimal use of channel capacity. Each bit-loading table specifies a number of bits for the set of all sub-channels used for transmission. The tone selection module 132 may further comprise a coefficient estimator 136 configured to estimate the coefficients associated with each of the N users 110a, 110b, 110c for FEXT mitigation. More details relating to estimation of coefficients are described in U.S. patent application Ser. No. 11/845,040, entitled "Systems and Methods for MIMO Precoding in an xDSL System," filed on Aug. 25, 2007, now U.S. Pat. No. 7,957,477, and U.S. patent application Ser. No. 12/123,925, entitled "Systems and Methods for Mitigating the Effects of Upstream Far-End Crosstalk," filed on May 20, 2008, now U.S. Pat. No. 7,835,368, both of which are herein incorporated by reference. Based on the computation of a second set of values for the function of the measured per-tone SNR calculated after FEXT mitigation is performed, tones are selected for FEXT mitigation. Specifically, the tone selection module 132 comprises comparison logic 137 for processing corresponding elements in the original and second set of values of the function of the measured per-tone SNR. Based on a comparison of these elements for each tone, a subset of $M_n$ tones is selected as the tones for FEXT mitigation for the $n^{th}$ user in the set of N users 110a, 110b, 110c.

Figure 3:
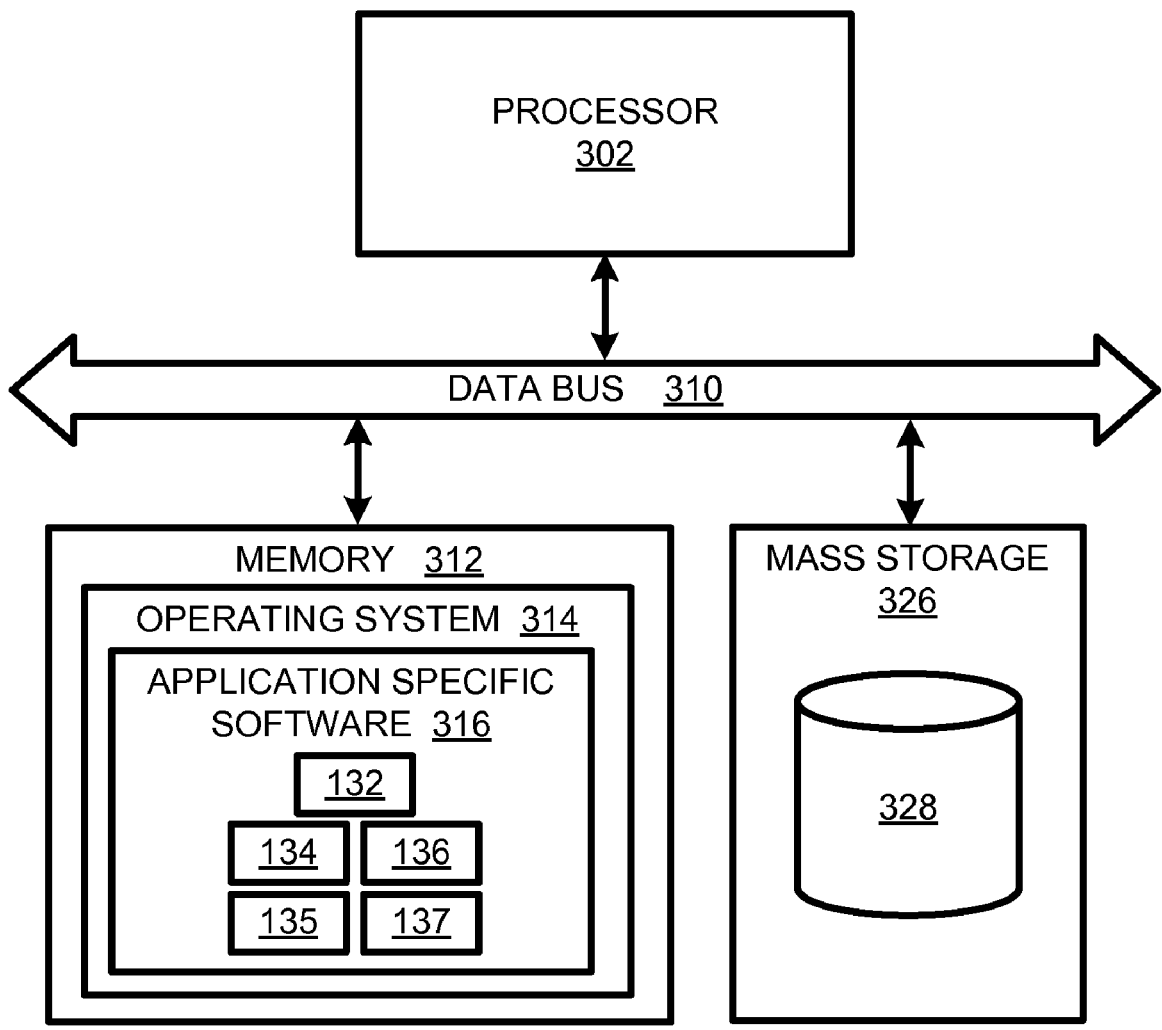
FIG. 3 illustrates an embodiment of an apparatus within the central office in FIG. 1 for executing the various components shown in FIGS. 1 and 2.

Reference is now made to FIG. 3, which illustrates an embodiment of an apparatus 130 within the central office (CO) in FIG. 1 for executing the various components shown in FIGS. 1 and 2. Generally speaking, the apparatus 130 may comprise any one of a number of computing devices. Irrespective of its specific arrangement, the apparatus 130 may comprise memory 312, a processor 302, and mass storage 326, wherein each of these devices are connected across a data bus 310.

The processor 302 may include any custom made or commercially available processor, a central processing unit (CPU) or an auxiliary processor among several processors associated with the apparatus 130, a semiconductor based microprocessor (in the form of a microchip), one or more application specific integrated circuits (ASICs), a plurality of suitably configured digital logic gates, and other well known electrical configurations comprising discrete elements both individually and in various combinations to coordinate the overall operation of the computing system.

The memory 312 can include any one or a combination of volatile memory elements (e.g., random-access memory (RAM, such as DRAM, and SRAM, etc.)) and nonvolatile memory elements (e.g., ROM, hard drive, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 stored on a computer readable medium for execution by the processor 302 and may include any of the modules 132, 134, 135, 136, 137 described with respect to FIG. 2. One of ordinary skill in the art will appreciate that the memory 312 can, and typically will, comprise other components which have been omitted for purposes of brevity. It should be noted, however, that the modules 132, 134, 135, 136, 137 may also be embodied as hardware.

Where any of the components described above comprises software or code, the same can be embodied in any computer-readable medium for use by or in connection with an instruction execution system such as, for example, a processor in a computer system or other system. In the context of the present disclosure, a computer-readable medium can be any tangible medium that can contain, store, or maintain the software or code for use by or in connection with an instruction execution system. For example, a computer-readable medium may store one or more programs for execution by the processing device 302 described above. The computer readable medium can be, for example, but not limited to, an electronic, magnetic, optical, electromagnetic, infrared, or semiconductor system, apparatus, or device.

More specific examples of the computer-readable medium may include an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). As shown in FIG. 3, the apparatus 130 may further comprise mass storage 326. For some embodiments, the mass storage 326 may include a database 328 for storing and managing data, such as the bit-loading tables described with reference to FIG. 2.

Figure 4A:
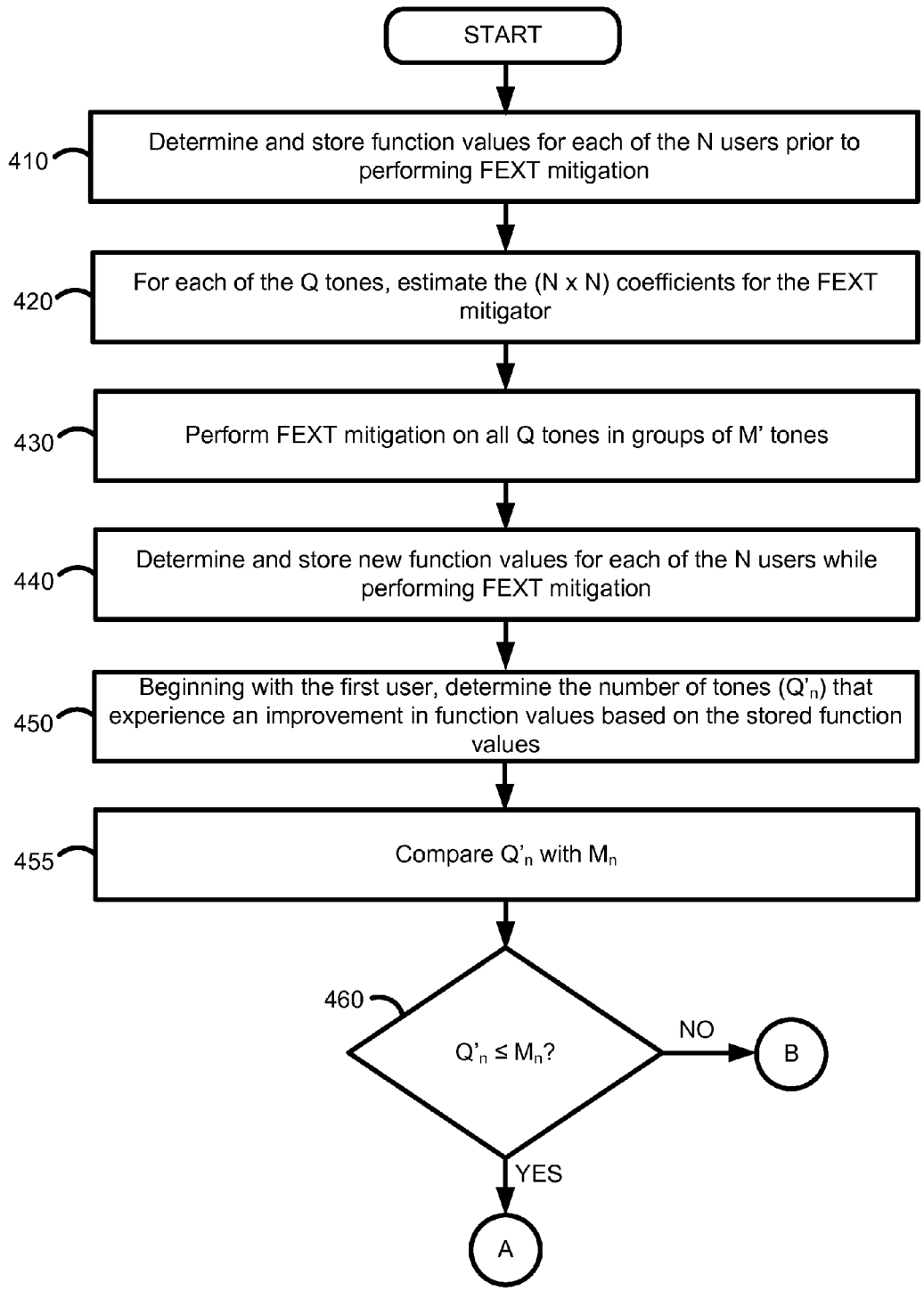
FIG. 4A-B depict a method for implementing tone selection for FEXT mitigation in the system depicted in FIG. 1.
Figure 4B:
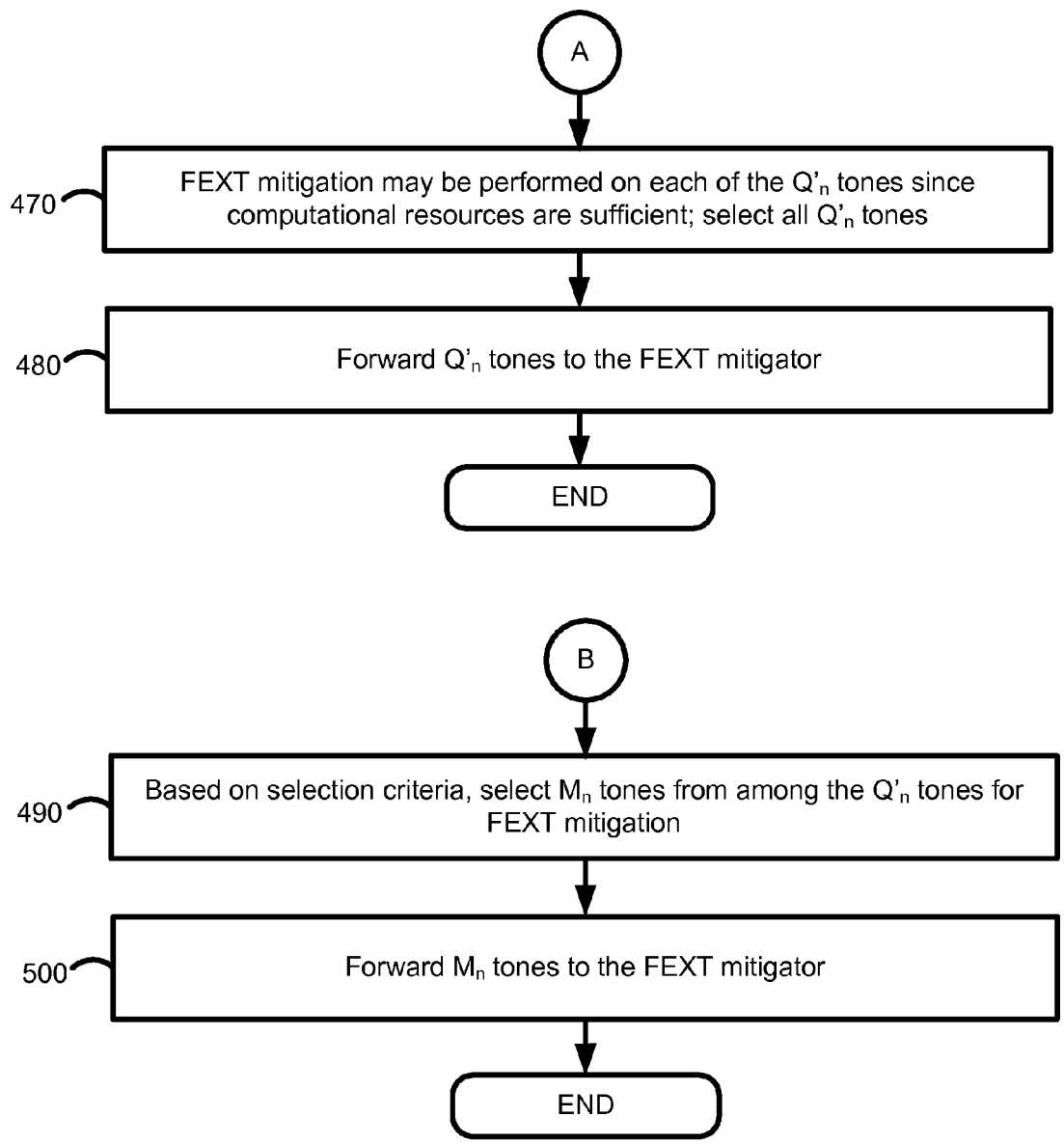

Having described various components for performing tone selection for FEXT mitigation, various processes for performing tone selection are now described. Reference is made to FIG. 4, which depicts a method for implementing tone selection for FEXT mitigation in the system depicted in FIG. 1. Beginning with block 410, function values relating to the per-tone SNR, such as bit-loading data, are determined for each of the N users and stored prior to performing FEXT mitigation using the FEXT mitigator 134. As described earlier, other functions that may be used such as the aggregate SNR of all or a subset of the tones may be utilized. Another function that may be used is the noise margin. As discussed above, the computed function values may be stored in the database 328 depicted in FIG. 3.

Assume that the computed function values are represented by $b_n$, where $1 \leq n \leq N$, where index n refers to the user. Also, let Q represent the total number of tones available for transmission. Thus, the computed function value for each user $b_n$ is a vector containing Q elements. In block 420, for each of the Q tones, the coefficients for the FEXT mitigator 134 are estimated for the set of N users. The FEXT mitigator for N users for a specific tone in its most general form is described mathematically by an N×N matrix. Thus, for some implementations, estimating the coefficients of the FEXT mitigator may comprise estimating (N×N) coefficients.

Other FEXT mitigator implementations may also be designed to exploit the diagonally dominant property of the frequency response matrix H[q,t], which leads to the FEXT mitigator being described as an N×N matrix with the diagonal elements forced to zero. For such implementations, estimating the coefficients of the FEXT mitigator may comprise estimating (N×N−1) coefficients. Let M' represent the maximum number of tones on which FEXT mitigation can be performed for each of the N users 110a, 110b, 110c depicted in FIG. 1 during the tone selection phase due to limits in computational resources. This estimation process may be performed in batches of $M' \leq Q$ tones in order to account for the limited computational resources of the CO. In block 430, the FEXT mitigator 134 is activated and applied to all Q tones in groups of M' tones.

In block 440, new function values relating to the per-tone SNR with the FEXT mitigator 134 engaged are determined for each of the N users 110a, 110b, 110c. Assume that the new function values with FEXT mitigation applied are represented by $b'_n$, where $1 \leq n \leq N$. The vector $b'_n$ also has Q elements. Note that the change between $b'_n$ and $b_n$ quantifies the improvement, if any, in the function values of the per-tone SNR associated with each of the Q elements as there will generally be some degree of improvement in the SNR when FEXT mitigation is applied.

Let $Q'_n$ represent the number of tones that experience an improvement in the function values relating to the per-tone SNR for user n. As a non-limiting example, if the bit-loading is computed as the function of the SNR, then $Q'_n$ represents the number of tones that experience an increase in bit-loading. The value of $Q'_n$ will be less than or equal to the value of Q as some tones might not experience any improvement in the function of the per-tone SNR even with FEXT mitigation applied. Such tones might not experience any improvement as these tones might not be experiencing any effects from FEXT to begin with.

In block 450, the user index n is set to 1 and the first user 110a, 110b, 110c is processed. Let $M_n$ represent the maximum number of tones on which FEXT mitigation can be performed for the $n^{th}$ user among the N users 110a, 110b, 110c depicted in FIG. 1 during steady state operation due to limits in computational resources. Note that M' and $M_n$ may be different since it is possible that more computational resources are temporarily allocated for FEXT mitigation during the tone selection process in order to speed up the estimation of the FEXT mitigator, and ultimately the tone selection process itself. Also, the values of $M_n$ may be different for different users. In order to determine the value of $M_n$ for the $n^{th}$ user, several factors may be considered, including but not limited to the following: (a) the service tier of the user—a user being offered a premium service at a higher cost may be allocated a larger value of $M_n$ as compared to a user paying less; (b) the distance between the CPE of a user and the CO—users with CPEs closer to the CO typically benefit from FEXT mitigation on more tones and hence could be assigned larger $M_n$ as compared to users whose CPEs are farther away from the CO; (c) overall system rate optimization—the allocation of $M_n$ to the users may also be determined by algorithms that focus on optimizing the rate of all the users in a vectored group based on satisfying certain constraints such as minimum rate requirements.

In particular, for each user n, the number of tones that experience an improvement in the function value of the per-tone SNR for user n ($Q'_n$) is compared to value $M_n$ using comparison logic 137 to determine whether $Q'_n$ is less than or equal to $M_n$ (block 455). If the value of $Q'_n$ is less than or equal to $M_n$ (decision block 460), then the FEXT mitigator 132 is applied to each of the $Q'_n$ tones (block 470) as there are ample computational resources for performing this. In block 480, all $Q'_n$ tones are selected and forwarded to the FEXT mitigator 134.

Referring back to decision block 460, if the value of $Q'_n$ is greater than $M_n$, then a selection criteria is applied to select $M_n$ tones (block 490). After the selection criteria is applied and the $M_n$ tones are selected, the $M_n$ tones are forwarded to the FEXT mitigator 134 (block 500). That is, if the number of tones that experience an improvement in the function value of the per-tone SNR exceeds the computational resources available, then only $M_n$ tones are selected.

For some embodiments, the $M_n$ tones that experience the largest improvement in the function value of the per-tone SNR are selected. For example, if bit-loading data is used as the function of the SNR, the $M_n$ tones that experience the largest improvement in bit-loading performance are selected. For alternative embodiments, other selection criteria may be implemented as well. The comparison involving the values of $Q'_n$ and $M_n$ are also performed by the comparison logic 137. The $M_n$ tones corresponding to the current user (user n) are then forwarded to the FEXT mitigator 134. As indicated previously, depending on the location of the FEXT mitigator 134 with respect to the tone selection module 132, a protocol may have to be incorporated between the CO and CPE to transport information of the tones selected by the tone selection module 132 to the FEXT mitigator 134. The index n is incremented (i.e., the next user is processed) and the steps above beginning at block 455 are repeated until all the users have been processed.

As described above, the FEXT mitigator 134 is engaged in the vectored system to generate the new function values of the per-tone SNR. As known by those skilled in the art, engaging the FEXT mitigator 134 to derive the new per-tone SNR and function values relating to the new per-tone SNR can be a time consuming process when compared to analytical computations of these quantities. Further, additional time may be involved in transporting the SNR or information on the selected tones when either the tone-selection module or the FEXT mitigator is not at the same end as the receiver that determines the SNR. A non-limiting example of such a configuration is when both the FEXT mitigator 134 and tone selection module 132 for downstream FEXT mitigation are located at the CO and where the downstream SNR is computed by the CPE. For such cases, the CO first requests that the SNR be reported by the CPE, and the CO must wait until these values are returned from the CPE. It should be noted, however, that this approach of engaging the FEXT mitigator in the vectored system to generate the new function values of the per-tone SNR ensures that the tone selection process is based on actual system conditions. It should also be noted that although new function values of the per-tone SNR are computed, these new values do not need to be used to modify transceiver settings while the tone-selection process is still in progress. For example, if function values of the per-tone SNR comprise bit loading data, it is not necessary for the system to operate based on the new bit loading data that is derived while the tone-selection process is in progress. Rather, the system waits until the tone-selection process is completed, and once the tones have been selected the system is then reconfigured to operate with the new bit loading values on the selected tones. The bit loading for tones that are not selected for FEXT mitigation remain unchanged. Also, it should be noted that the above procedure may be applied for a given user while the user is in the initialization phase or while the user is in data mode (i.e., Showtime).

It should also be appreciated that with the embodiments described herein, tone selection is based on actual line measurements for the improvement in the function value relating to the SNR and hence can be expected to more accurately capture the impact of engaging the FEXT mitigator 134. The embodiments described further provide a method for tone selection without the need for explicitly estimating channel coupling. Rather, the FEXT mitigator coefficients may themselves be directly estimated. The embodiments described also provide a method for tone selection when upstream alien crosstalk mitigation is performed. Although various embodiments are described herein in the context of signal co-operation and FEXT mitigation at the CO, the same principles can be applied when it is possible to carry out signal co-operation and FEXT mitigation at the CPE. A multi-pair bonded xDSL systems where the CPE is connected to the CO through two or more twisted pairs represents a non-limiting example of a system where signal co-operation and FEXT mitigation may be carried out at the CPE.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for performing far-end crosstalk (FEXT) mitigation within a digital subscriber line (xDSL) system, comprising:
    determining a first set of function values relating to a per-tone signal-to-noise ratio (SNR) for a user among a plurality of users for a number of tones, wherein the number of tones is less than or equal to a total number of tones available for transmission;
    estimating coefficients for performing FEXT mitigation for the number of tones;
    performing FEXT mitigation on the number of tones based on the estimated coefficients; and
    performing FEXT mitigation on a selected group of tones from among the number of tones, wherein the selected group of tones is less than or equal to the number of tones.

2. The method of claim 1, further comprising:
    requesting the first set of function values relating to the per-tone SNR; and
    receiving the first set of function values relating to the per-tone SNR.

3. The method of claim 1, wherein estimating coefficients comprises estimating up to N coefficients for performing FEXT mitigation, where N represents the number of users in the xDSL system.

4. The method of claim 1, further comprising performing signal vectoring at a central office (CO) across the plurality of users to mitigate self-FEXT.

5. The method of claim 1, wherein performing FEXT mitigation on a selected group of tones from among the number of tones comprises determining a maximum number of tones available for FEXT mitigation based on resources available for performing FEXT mitigation.

6. The method of claim 5, wherein performing FEXT mitigation on a selected group of tones from among the number of tones further comprises:
   determining a second set of function values relating to the per-tone SNR for the user for the number of tones while performing FEXT mitigation;
   comparing the first set of function values with the second set of function values; and
   for the user, identifying tones that experience an improvement with respect to function values based on the comparison between the first and second set of function values.

7. The method of claim 6, wherein performing FEXT mitigation on a selected group of tones from among the number of tones further comprises determining the selected group of tones on which to perform FEXT mitigation based on:
   the tones that experience an improvement with respect to function values; and
   the maximum number of tones available for FEXT mitigation based on resources available for performing FEXT mitigation.

8. The method of claim 6, further comprising:
   requesting the second set of function values relating to the per-tone SNR; and
   receiving the second set of function values relating to the per-tone SNR.

9. The method of claim 6, wherein performing FEXT mitigation on a selected group of tones from among the total number of tones further comprises:
   if the number of tones that experience an improvement with respect to function values is less than or equal to the maximum number of tones available for FEXT mitigation, then designating all of these tones as the selected group of tones; and
   if the number of tones that experience an improvement with respect to function values is greater than the maximum number of tones available for FEXT mitigation, then applying a selection criteria to designate up to the maximum number of tones available for FEXT mitigation from among the number of tones that experience an improvement with respect to function values as the selected group of tones.

10. The method of claim 9, wherein the first set and second set of function values comprise bit-loading data, and
   wherein the selection criteria comprises selecting tones with a largest increase in bit-loading performance.

11. The method of claim 1, further comprising:
   determining a first set of function values relating to the per-tone SNR for up to each of the remaining users for the number of tones;
   for each tone among the number of tones, estimating coefficients for performing FEXT mitigation for up to each of the remaining users;
   performing FEXT mitigation on up to each of the total number of tones based on the estimated coefficients; and
   performing FEXT mitigation on a selected group of tones from among the number of tones, wherein a selected group of tones is determined for up to each of the remaining users.

12. A system for performing far-end crosstalk (FEXT) mitigation, comprising:
   a tone selection module configured to select a group of tones from among a number of tones for each of a plurality of users, wherein the number of tones is less than or equal to a total number of tones available for transmission, wherein the tone selection module comprises logic for calculating function values relating to a signal-to-noise ratio (SNR) for each tone for each of the plurality of users, wherein the logic for calculating function values is configured to calculate a first set of function values for each of the tones with the FEXT mitigation operation inactive and a second set of function values for each of the tones with the FEXT mitigation operation active; and
   a FEXT mitigator configured to perform FEXT mitigation on a selected group of tones for each of the plurality of users.

13. The system of claim 12, wherein the tone selection module comprises:
   comparison logic configured to determine the selected group of tones based on a comparison between the first set and second set of function values.

14. The system of claim 13, wherein the tone selection module further comprises a coefficient estimator configured to estimate coefficients associated with each of the plurality of users for FEXT mitigation.

15. The system of claim 13, wherein the first and second set of function values are utilized to compare bit-loading data as a function of SNR.

16. The system of claim 13, wherein the comparison logic determines the selected group of tones based on tones with a largest improvement with respect to the first set and second set of function values.

17. The system of claim 13, wherein the comparison logic determines the selected group of tones based on tones with at least a predetermined level of improvement between the first set and second set of function values.

18. The system of claim 16, wherein the comparison logic further determines the selected group of tones based on a maximum number of tones on which FEXT mitigation can be performed based on available resources in the system.

19. The system of claim 18, wherein each of the plurality of users has a corresponding maximum number of tones.

20. The system of claim 18, wherein the comparison logic determines the selected group of tones such that the selected group of tones is less than or equal to the maximum number of tones.

21. A method for performing far-end crosstalk (FEXT) mitigation within a digital subscriber line (xDSL) system, comprising:
   performing signal vectoring at the CO across a plurality of users to mitigate self-FEXT;
   determining a first set of function values for each of the plurality of users for each tone among a total number of tones available for transmission in the xDSL system, wherein determining the first set of function values is performed with FEXT mitigation not activated;
   for up to the total number of tones, estimating coefficients for performing FEXT mitigation for each tone;
   performing FEXT mitigation for the plurality of users on up to the total number of tones based on the estimated coefficients; and
   while performing FEXT mitigation, determining a second set function values for each the plurality of users for up to the total number of tones;

based on the first set and second set of function values, selecting for each user a set of tones on which to perform FEXT mitigation; and performing FEXT mitigation on the selected set of tones for each user.

22. The method of claim 21, wherein estimating coefficients for performing FEXT mitigation comprises determining up to N×N coefficients, wherein N is the number of users.

23. The method of claim 22, wherein estimating coefficients for performing FEXT mitigation comprises determining N×(N−1) coefficients.

24. The method of claim 21, wherein selecting for each user a set of tones on which to perform FEXT mitigation comprises determining a maximum number of tones for FEXT mitigation based on resources available in the xDSL system for performing FEXT mitigation.

25. The method of claim 24, wherein the first and second set of function values comprise bit-loading data, and wherein selecting for each user a set of tones on which to perform FEXT mitigation further comprises identifying, for each user, tones that experience an increase in bit-loading performance.

26. The method of claim 25, wherein selecting for each user, a set of tones on which to perform FEXT mitigation further comprises:
  if the number of tones that experience an increase in bit-loading performance is less than or equal to the maximum number of tones, then designating all of these tones as the selected set of tones; and
  if the number of tones that experience an increase in bit-loading performance is greater than the maximum number of tones, then applying a selection criteria to designate up to the maximum number of tones from among the number of tones that experience an increase in bit-loading performance as the selected set of tones.

27. The method of claim 26, wherein the selection criteria comprises selecting tones with a largest increase in bit-loading performance.

* * * * *